United States Patent Office 2,863,753
Patented Dec. 9, 1958

2,863,753

METHOD OF WEED CONTROL

Ralph Louis Wain, near Ashford, England, assignor to National Research Development Corporation, London, England, a British company No Drawing. Application April 22, 1955
Serial No. 503,321

Claims priority, application Great Britain July 6, 1954

10 Claims. (Cl. 71—2.6)

This invention relates to new aryloxyaliphatic compounds, to selective herbicidal compositions containing one or more of these compounds and to new methods of weed control utilising the said compositions.

Prior to the advent of the so-called "hormone" or "systemic" herbicides, the most effective methods of selective weed control, i. e. destruction or prevention of growth of weeds in areas sown, or to be sown, with useful crops, were dependent upon differences in morphology and habit of growth between crop and weed and utilised such contact herbicides as sulphuric acid, dinitro-compounds and copper salts. Of recent years, the use for various applications of the contact type of herbicide has largely given way to the use of the "hormone" or "systemic" type compounds which, in the case of some plants, stimulate or modify plant growth when applied up to a certain concentration and act to retard or finally to kill the plant when applied at higher concentration. The efficiency of the latter type compounds depends upon a "physiological" resistance to these compounds of certain families of plants, particularly monocotyledons, as compared to dicotyledons.

At the present time "hormone" type herbicides are widely used with highly successful results in agriculture for selective weed control in useful crops. Thus, for example, they can be used to control such weeds as charlock in a field of growing cereal. The most widely known class of hormone-type herbicides consists of certain aryloxy-aliphatic acids and derivatives such as salts, esters and amides, see, for example, the Jones Patents Nos. 2,390,941, 2,396,513 and 2,412,510. Research and experimentation have shown that only certain—indeed but relatively few—aryloxy-aliphatic acids and their derivatives exhibit activity as selective herbicides. Thus, for example, phenoxyacetic acid and its 2:6-dichloro-, 3:5-dichloro- and 2:4:6-trichloro derivatives are quite inactive whereas 2:4-dichlorophenoxyacetic acid (2:4-D) and the corresponding 2:4:5-trichloro- compound have met with very considerable success (as also has 2-methyl-4-chlorophenoxyacetic acid) in weed control. As regards the higher members of the homologous series of which these active acetic acid derivatives are respectively the lowest members, it is now generally accepted that they are inactive per se but can be converted by β-oxidation in the plant either to the active acetic acid homologue or in other cases to an inactive metabolic product. In any event an alternation in growth-regulating activity has been demonstrated to occur with increasing length of side-chain. Thus, Synerholm and Zimmerman (Contributions of the Boyce Thompson Institute 14, (7):369–382, 1947) have reported on an investigation of a number of aryloxyaliphatic acids as possible plant-growth regulants, concluding in the case of the ω-(2:4-dichlorophenoxy)aliphatic acid series that they are physiologically active or inactive depending upon whether they contain respectively an even or odd number of carbon atoms in the aliphatic acid portion of the molecule. While pointing out that it is impossible to extend the generalisation to include all growth regulators of the aryloxy-aliphatic acid type, they further observed inactivity in the chlorophenoxybutyric acid series. More specifically, they noted, on the basis of experiments with tomato plants, that γ-(2:4:5-trichlorophenoxy)-butyric acid appears to be inactive even at 100 mg./g. in lanolin despite the fact that the acetic acid homologue of this compound is a very active growth regulator. Whether on account of the wide acceptance of the aforesaid theory or whether on the basis of the undeniable fact that the active acetic acid derivatives have one advantage or another over higher homologues, there is no doubt that throughout the world but a very few aryloxy-aliphatic compounds are used on any substantial scale as selective herbicides and all of them belong to the acetic acid or alkyl-substituted acetic acid series.

The importance of the known hormone-type herbicides is illustrated by the fact that at the present time over 100,000,000 acres of the world's surface are sprayed annually for weed control. They have by now been used for a sufficiently long time and under such varied circumstances as to bring out their inherent limitations, more especially the selectivity spectrum is not as wide as required and there are many important plants which are damaged or destroyed by them to the same or, in some cases, to a greater degree or with a greater speed than the neighbouring weeds to be eradicated. Indeed, in general, it can be said that none of the herbicides heretofore known offers a satisfactory answer to the problem of weed control in broad-leafed plants at the concentrations customarily used.

The primary object of the invention is to provide methods for eradicating weeds in areas sown with useful broad-leaf crops which cannot satisfactorily and economically be treated with herbicidal compositions hitherto known.

Another object of importance is to provide wholly new "hormone" or "systemic" herbicides. Another important object is to provide selective herbicidal compositions which, for the control of weeds in important varieties of leguminous fodder crops of the genera Trifolium such as clovers and similarly, but with less importance, celery, are far more effective than hitherto known compositions such as 2:4-D.

Research and experimentation on selective weed control conducted by and under the direction of the present applicant over the past few years has resulted in the discovery that, in addition to the factors on which the use of firstly the so-called contact-type and secondly the so-called hormone-type of herbicides has been based, there is a further relevant factor constituting a new and fundamental principle upon which selective weed control may operate. It has thus been discovered that specific β-oxidase enzyme systems may be present in the tissues of different plant species and that there may be a definite relationship between the enzyme make-up of a particular plant tissue and the chemical character of, including more particularly the nature and position of nuclear substituents in, an ω-aryloxyalkanecarboxylic acid type hormone herbicide derived from straight chain aliphatic acids higher in the series than acetic acid such that in respect of that particular plant a specific type of herbicidal agent can be provided which, due to the enzyme system specific to the plant species in question, is not degraded in that plant to the active acetic derivative, but which is nevertheless so degraded within the tissues of many common weeds of the type normally to be found in association with the plant species in question.

More specifically, according to the present invention it has been found that members of the class consisting of γ-(2-methyl-4-chlorophenoxy)-butyric acid, the corresponding caproic acid and certain derivatives of these acids quite unexpectedly have significantly less growth regulating activity with respect to certain plant species that are adversely affected by the corresponding aryloxy acetic compounds hitherto used for the control of weeds in growing crops, while having a growth-regulating activity with respect to other plant species of the same order as that possessed by those corresponding acetic compounds. More particularly, the said new compounds possess no appreciable growth regulating activity with respect to such crop plants of economic importance as clover, celery, carrot, parsnip and pea, all of which can be severely affected by 2:4-dichlorophenoxy-, 3:4-dichlorophenoxy- and 2-methyl-4-chlorophenoxy- acetic acids and other such known hormone-type herbicides when applied at the same concentration. At the same time, these new compounds will control a range of important weeds such as charlock, fumitory, fat-hen, creeping thistle and annual nettle at conventional concentrations.

This, as it were, super-selective action arising from selective chemical modification within plant tissue is highly specific. Thus, it is not possessed by the corresponding α-substituted acids which are in fact similar in properties to the corresponding chlorophenoxyacetic acids.

The unexpected and valuable properties of the compounds of the invention which have been clearly demonstrated not merely by greenhouse and laboratory experiments but also in scientifically controlled field trials are of very great economic importance. Thus, it is estimated that the area sown with clover as a useful crop in the United States per annum amounts to some 40,000,000 acres and there is at the present time no satisfactory herbicide available for eradicating weeds in such crops without at the same time damaging the crop itself.

A great many field experiments have been carried out by various workers on the use of 2:4-dichlorophenoxyacetic acid and 2-methyl-4-chlorophenoxyacetic acid to discover at what rates these two commonly used herbicides might safely be used on grassland and cereals when clover is present. The results, however, are not very satisfactory even using applications as low as a few ounces per acre which have been recommended when, as will be evident, a much lower efficiency in weed destruction is obtained. In contradistinction, the compounds of the present invention have been demonstrated to offer a fully effective control of such weeds as charlock (*Sinapis arvensis*), annual nettle (*Urtica urens*) and creeping thistle (*Cirsium arvense*) in a clover crop, direct seeded or under sown and in established clover leys whereas the corresponding acetic acids applied at similar concentrations can produce disastrous effects on the crop. This and related points are borne out by the following test results; for brevity 2-methyl-4-chlorophenoxyacetic acid, γ-(2-methyl-4-chlorophenoxy)-butyric acid and the corresponding caproic acid are named "MCPA," "MCPB" and "MCPC" respectively.

(a) Pot experiments

Seedlings of the following crops and weeds were sprayed to run off with aqueous solutions containing 0.1% of the respective sodium salts together with 0.2% wetting agent of the sodium secondary alcohol sulphate type. After 4 weeks, observations were recorded as follows.

| Species | MCPB | MCPA | MCPC |
|---|---|---|---|
| Weeds: | | | |
| Annual nettle (*Urtica urens*) | Dead | Dead | Dead. |
| Fat hen (*Chenopodium album*) | do | do | |
| Fumitory (*Fumaria officinalis*) | do | do | |
| Knotgrass (*Polygonum ariculare*) | do | do | |
| Creeping thistle (*Cirsium arvense*) | do | do | Do. |
| Crops: | | | |
| White clover (*Trifolium repens*) | No effect | Very severe damage. | No effect. |
| Red clover (*Trifolium pratense*) | Very slight effect. | do | Do. |
| Carrot (*Daucus carota*) | No effect | Dead | Do. |
| Parsnip (*Pastinaca sativa*) | do | do | Do. |
| Celery (*Apium graveolens*) | do | do | Do. |

(b) Field experiment on celery with very heavy infestation of annual nettle

Field plots were sprayed with aqueous solutions of the sodium salt of MCPB at rates corresponding to 1 and 2 lbs. per acre. There was a very dense population (about 45% of ground cover) of annual nettle (about 6" high) with some groundsel (3") and sow thistle (4–6"). The annual nettle and sow thistle were completely eradicated by one application both at the 1 lb. and 2 lb. rates. The groundsel plants were only slightly affected.

The crop plants remained completely unharmed and were harvested and marketed as usual. MCPA, however, applied as its sodium salt at 2 lbs. per acre killed the celery plants outright within four weeks.

(c) Control of weeds in field experiments with MCPB (i) MCPB applied at the following rates per acre as a solution of its diethanolamine salt gave the results shown below:

| Weed | Height at Spraying, inches | Percent control (dose rate in lbs. per acre) | | |
|---|---|---|---|---|
| | | ½ | 1 | 2 |
| Creeping Thistle | 6 | 80 | 84 | 100 |
| | 15–18 | 83 | 91 | 92 |
| Fat hen | 2 | 96 | 95 | 96 |
| Knot grass | 3 | 19 | 65 | 87 |
| Sow thistle (perennial) | | 100 | 100 | 100 |
| Do | | 79 | 86 | 72 |

(ii) MCPB as its ethyl ester was applied to field plots as an emulsion made up from a self emulsifying concentrate in mineral oil containing 40% w./v. acid equivalent, results are shown below:

| Weed | Height at Spraying, inches | Percent control (dose rate in lb. per acre) | | |
|---|---|---|---|---|
| | | ½ | 1 | 2 |
| Creeping Thistle | 6 | 100 | 100 | 100 |
| Fat hen | 4 | 75 | 75 | 88 |
| Knot grass | | 72 | 79 | 79 |
| Sow thistle (perennial) | | 73 | 93 | 100 |

(d) Comparison of effect on seedling clover vigour of MCPB and MCPA

MCPB as a solution of its sodium salt and MCPA as a solution of its potassium salt were applied to field plots of seedling clover (variety: Kentish wild white). All MCPA treatments affected the clover, in some cases very severely, but there was no damage following the MCPB treatments. After 12 weeks the following results were obtained:

| Compound | Clover leaf density as percentage of control (dose rate in lb. per acre) | | | | |
|---|---|---|---|---|---|
| | ½ | ¾ | 1 | 2 | 3 |
| MCPA | 77 | 79 | 90 | 73 | 39 |
| MCPB | 140 | 190 | 187 | 194 | 141 |

Weeds present: Moderate population of creeping thistle controlled by both compounds by all rates above ½ lb. Dense population of ivy leaved speedwell checked by both compounds by rates above ¾ lb.

The beneficial properties of the aforesaid new acids are also possessed by their salts with inorganic and organic bases, of which examples are the sodium, potassium, ammonium, alkylamine and alkanolamine (including ethanolamine) salts, their esters, of which examples are the methyl and ethyl esters, and their amides and nitriles.

The compounds of the present invention may be prepared by the classical methods heretofore employed for the production of ω-(substituted phenoxy)-aliphatic compounds as is illustrated by Example I hereinafter given. For industrial use they may be employed in any of the physical forms in which plant-growth regulants or herbicides of the 2:4-D type are customarily used; in all cases in association with an inert diluent. In the case of water-soluble compounds, e. g. the alkali metal salts, it is convenient to employ an aqueous solution where application in liquid form is desired. Alternatively, they may be used as solid compositions in conjunction, therefore, with solid diluents such as talc, clay or other such inert material. In the case of compounds insoluble or but sparingly soluble in water, it is convenient to employ them in the form of an aqueous emulsion incorporating a wetting, dispersing or emulsifying agent of the ionic or non-ionic type, the latter being preferred since they are not affected by electrolytes. The latter type of formulation is preferably made up as a self-emulsifying concentrate containing the active substance dissolved in the dispersing agent or in a solvent compatible with that dispersing agent, the composition being made ready for use by the simple addition of water. Specific compositions include aqueous solutions of water-soluble salts which may contain a wetting agent, wettable powders containing either acid or amide in association with diluent powder and wetting agent, oil emulsions containing one or more of the esters and micronised oil suspensions of either acid.

The present invention is illustrated by the following examples:

EXAMPLE I 50 ml. of absolute alcohol were placed in a 250 ml. flask fitted with reflux condenser and calcium chloride guard tube and 1.2 g. sodium was added. When the reaction ceased, 7.1 g. of 2-methyl-4-chlorophenol was added followed by 5.2 g. of γ-chlorobutyronitrile. After refluxing for 4 hours, 50 ml. of 2 N sodium hydroxide solution were added and the mixture refluxed for 6 hours. The alcohol was then removed by distillation and the cold diluted solution was filtered into excess 4 N hydrochloric acid. The buff coloured precipitate (7.7 g.) was filtered, washed with water, dissolved in ether and the solution extracted three times with 5% sodium bicarbonate solution. The bulked aqueous layers were warmed to remove traces of ether, cooled and acidified (Congo). The precipitate was filtered and dried. The dry product was crude γ-(2-methyl-4-chlorophenoxy)-butyric acid in the form of a white powder, melting point 99–101° C. After recrystallisation from petroleum ether, 4.5 g. of colourless needles (M. P. 100–101° C.) were obtained. Neutralisation equivalent: Found 228.0; $CH_3.Cl.C_6H_3O(CH_2)_3COOH$ requires 228.5.

From the aforesaid acid the following derivatives were prepared by conventional technique:

Derivative: | Characteristics
--- | ---
Nitrile | Colourless oil B. P. 133–137° C./0.2 mm.
Amide | M. P. 115° C.
Sodium salt | deliquescent solid.
Potassium salt | deliquescent solid.
Ammonium salt | crystalline solid.
Calcium salt | insoluble white powder.
Magnesium salt | very sparingly soluble white powder.
Methyl ester | B. P. 141–6° C./0.1 mm.
Ethyl ester | B. P. 132°–8° C./0.2 mm.
N-butyl ester | B. P. 154–60° C./0.3 mm.
β-n-Butoxyethyl ester | B. P. 184–95° C./0.2–4 mm.

EXAMPLE II 300 g. sodium was reacted with 100 ml. of absolute alcohol and 18.0 g. of 2-methyl-4-chlorophenol was added. This solution was added dropwise to 52.0 g. of 1:5-dibromopentane in 100 ml. of boiling absolute alcohol. A white solid separated after a few minutes. After refluxing for 4 hours, alcohol was distilled off, the residue poured into water and the mixture extracted with ether. The ethereal solution was washed twice with 4% $NaHCO_3$ solution and twice with water. After drying and removing ether an oil was obtained which was distilled under reduced pressure. This gave 1-bromo-5-(4'-chloro-2'-methylphenoxy) pentane as a colorless oil, B. P. 122–128° C./0.1 mm. Yield 82%.

To 10.0 g. of this bromide in 80 ml. of methanol, 4.0 g. of potassium cyanide in 5 ml. warm water were added. After refluxing for 24 hours, 8.0 g. of sodium hydroxide in 15 ml. of water were added and the boiling was continued until ammonia ceased to be evolved (20 hours). The mixture was then diluted with 600 ml. of water and the solution extracted with ether. The aqueous solution was acidified with hydrochloric acid and the solid product filtered, washed and dried. Yield 6.3 g. (72%). After recrystallisation from 80–100 petroleum, 5.8 g. of ω-(2-methyl-4-chlorophenoxy)-caproic acid, colourless prisms M. P. 92–93° C., were obtained.

From the aforesaid acid, the stated derivatives can be prepared by conventional methods e. g. amide (M. P. 111° C.), sodium and ammonium salts (both white solids) and the ethyl ester (a colourless oil, B. P. 165–168° C./0.5 mm.).

For the purpose of the invention, the aforesaid new herbicidal compounds will be used in a concentration of at least 0.05% by weight, the balance consisting of a vehicle, fillers etc. The optimum concentration will naturally vary according to the crop to be treated but in general concentrations ranging between 1 to 2 lbs. per acre will be entirely satisfactory.

The following are illustrative examples of effective herbicidal compositions according to the invention, parts stated are by weight unless otherwise specified.

EXAMPLE III

| | Parts |
| --- | --- |
| Sodium γ-(2-methyl-4-chlorophenoxy)-butyrate (acid dissolved in theoretical quantity of caustic soda) | 44 |
| Ethylene di-amine tetra-acetic acid | 0.2 |
| Sodium hydroxide | 0.5 |
| Water to 100 parts by volume. | |

The foregoing constitutes a stock concentrate one part by volume of which can be added to 29 parts by volume of water for application at the rate of 15 gallons per acre.

EXAMPLE IV

In the concentrate of Example III the said sodium salt was replaced by 48 parts of the corresponding potassium salt.

EXAMPLE V

A concentrate as described in Example III was made up using 48 parts of ammonium ω-(2-methyl-4-chlorophenoxy)caproate in place of the said sodium salt.

EXAMPLE VI

To any of the formulations of Examples III to V, 2.0 parts by weight of sodium lauryl sulphate may be added.

EXAMPLE VII 40 parts by weight of γ-(4-chloro-2-methylphenoxy)-butyric acid was warmed with 25 parts by weight of diethanolamine until the acid had dissolved. Water was added to give 100 parts by volume.

One part by volume of this concentrate could be diluted with 14 parts by volume of water for application at the rate of 15 gallons per acre.

EXAMPLE VIII

In a formulation of the type described in Example VII 20 parts of diethylamine were substituted for the diethanolamine.

EXAMPLE IX

In formulations as described in Examples VII and VIII, a quantity of "Texafor" F, a non-ionic wetting agent of the alkyl phenol-ethylene oxide type, may be incorporated.

The next following examples illustrate ester formulations made up as emulsions. These are usually prepared in the form of self-emulsifying concentrates in which the ester and the emulsifying agent is dissolved in a large bulk of a solvent (usually a mineral oil or an aromatic solvent such as xylene) or in which the emulsifying agent is dissolved in the ester with the possible addition of a small bulk of a co-solvent.

EXAMPLE X

| | Parts |
|---|---|
| Ethyl γ-(4-chloro-2-methyl-phenoxy)butyrate | 45 |
| Sodium di-nonyl sulpho-succinate | 3 |
| "Texafor" D40 (a castor-oil polyethylene oxide condensation product) | 11 |
| Shell oil 132 (a light grade mineral oil) to 100 parts by volume. | |

1 part by volume of this concentrate can be mixed with 59 parts by volume of water to form a stable emulsion for application at the rate of 15 gallons per acre.

EXAMPLE XI

In the formulation of Example X, 50 parts of ethyl ω-(4-chloro-2-methyl-phenoxy) caproate were used in place of the corresponding butyrate.

EXAMPLE XII

| | Parts |
|---|---|
| β-Butoxy-ethyl γ-(4-chloro-2-methylphenoxy)butyrate | 86.5 |
| Sodium di-nonyl sulpho-succinate | 4 |
| Texafor D.40 | 13.5 |
| Xylene | 4 |

1 part by volume of this concentrate can be mixed with 39 parts by volume of water to form a stable emulsion for application at the rate of 10 gallons per acre.

The next following example illustrates the use of aqueous suspensions of water-insoluble compounds (e. g. the acids and their amides). These suspensions contain finely ground active substance in admixture with a wetting agent, with or without an inert carrier material.

EXAMPLE XIII

| | Parts |
|---|---|
| γ-(4-chloro-2-methyl-phenoxy)butyramide | 40 |
| Calcined silica dust | 40 |
| Sodium lauryl sulphate powder | 20 |

The whole was ground together to produce a powder of mean particle size of about 10 microns.

One part by weight of this dispersible powder may be mixed thoroughly with 200 parts by volume of water and the resulting suspension applied at the rate of 100 gallons per acre.

The following examples illustrate the employment of the compounds of the invention in dry preparations. These may contain the acid, the amide or any salt or ester. In the case of esters, dusts can be formed by spraying a solution of the ester in mineral oil or other solvent onto the inert carrier material with continuous mixing. The others may be incorporated by grinding the constituents together.

EXAMPLE XIV

| | Parts |
|---|---|
| n-Butyl-γ-(4-chloro-2-methyl-phenoxy)butyrate | 1 |
| Mineral oil 132 | 1 |

This solution was sprayed onto and mixed with 98 parts of finely divided native gypsum. This dust may be applied at the rate of 2 cwts. per acre.

EXAMPLE XV

| | Parts |
|---|---|
| γ-(4-chloro-2-methyl-phenoxy)butyric acid | 2 |
| Native gypsum | 98 |

This dust may be applied at the rate of 2 cwts. per acre.

I claim:

1. A method for the control of weeds in crops selected from the class consisting of clover, celery, carrot, parsnip and pea which comprises applying to the crop area at a rate sufficient to kill the weeds without significant damage to the crop a herbicide of the class consisting of the ω-(2-methyl-4-chlorophenoxy)-butyric and caproic acids, their salts, esters, amides and nitriles.

2. A method for the control of weeds in crops selected from the class consisting of clover, celery, carrot, parsnip and pea which comprises applying to the weeds at a rate sufficient to control the weeds without significant damage to the crop a herbicidal composition containing a compound of the class consisting of the ω-(2-methyl-4-chlorophenoxy)-butyric and caproic acids, their salts, esters, amides and nitriles in association with an inert carrier, said compound constituting at least .05% by weight of the composition.

3. A method for the control of weeds of the type of charlock, creeping thistle and annual nettle in a clover crop in which a compound of the class consisting of the ω - (2 - methyl - 4 - chlorophenoxy) - butyric and caproic acids, their salts, esters, amides and nitriles is applied to the crop area in a concentration ranging between 1 and 2 lbs. per acre.

4. A method for the control of weeds of the type of charlock, creeping thistle and annual nettle in a clover crop, in which γ-(2-methyl-4-chlorophenoxy)-butyric acid is applied to the crop area in a concentration ranging between 1 and 2 lbs. per acre.

5. A method for the control of weeds of the type of charlock, creeping thistle and annual nettle in a clover crop, in which a γ-(2-methyl-4-chlorophenoxy)-butyric salt is applied to the crop area in a concentration ranging between 1 and 2 lbs. per acre.

6. A method for the control of weeds of the type of charlock, creeping thistle and annual nettle in a clover crop, in which a γ-(2-methyl-4-chlorophenoxy)-butyric ester is applied to the crop area in a concentration ranging between 1 and 2 lbs. per acre.

7. A method for the control of weeds of the type of charlock, creeping thistle and annual nettle in a clover crop, in which γ-(2-methyl-4-chlorophenoxy)-butyric amide is applied to the crop area in a concentration ranging between 1 and 2 lbs. per acre.

8. A method for the control of weeds of the type of charlock, creeping thistle and annual nettle in a clover crop, in which γ-(2-methyl-4-chlorophenoxy)-butyric nitrile is applied to the crop area in a concentration ranging between 1 and 2 lbs. per acre.

9. A method for the control of weeds in cereal undersown with clover which comprises applying to the crop area at a rate sufficient to kill the weeds without significant damage to the cereal and clover crop a herbicidal composition containing a compound of the class consisting of the ω-(2-methyl-4-chlorophenoxy)-butyric and caproic acids, their salts, esters, amides and nitriles in association with an inert carrier.

10. A method for the control of weeds in a pea crop which comprises applying to the crop area at a rate sufficient to kill the weeds without significant damage to the peas a herbicidal composition containing a compound of the class consisting of the ω-(2-methyl-4-chlorophenoxy)-butyric and caproic acids, their salts, esters, amides and nitriles in association with an inert carrier.

References Cited in the file of this patent

FOREIGN PATENTS

| | | |
|---|---|---|
| 591,744 | Great Britain | Aug. 27, 1947 |
| 598,484 | Great Britain | Feb. 19, 1948 |

OTHER REFERENCES

Contrib. Boyce Thompson Institute, January–March 1947, pp. 369–382.